US010720819B2

(12) United States Patent
Suntharalingam et al.

(10) Patent No.: US 10,720,819 B2
(45) Date of Patent: Jul. 21, 2020

(54) SWITCHED RELUCTANCE MACHINE WITH TOROIDAL WINDING

(71) Applicant: ENEDYM INC., Hamilton (CA)

(72) Inventors: Piranavan Suntharalingam, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 344 days.

(21) Appl. No.: 15/561,542

(22) PCT Filed: Apr. 6, 2016

(86) PCT No.: PCT/CA2016/050396
§ 371 (c)(1),
(2) Date: Sep. 26, 2017

(87) PCT Pub. No.: WO2016/161509
PCT Pub. Date: Oct. 13, 2016

(65) Prior Publication Data
US 2018/0083519 A1    Mar. 22, 2018

Related U.S. Application Data

(60) Provisional application No. 62/143,282, filed on Apr. 6, 2015.

(51) Int. Cl.
*H02K 19/10* (2006.01)
*H02K 3/28* (2006.01)
(Continued)

(52) U.S. Cl.
CPC .......... *H02K 19/103* (2013.01); *H02K 1/148* (2013.01); *H02K 1/246* (2013.01); *H02K 3/28* (2013.01);
(Continued)

(58) Field of Classification Search
CPC .. H02K 15/022; H02K 15/095; H02K 15/165; H02K 19/103; H02K 19/12;
(Continued)

(56) References Cited

U.S. PATENT DOCUMENTS 5,190,250 A * 3/1993 DeLong ................. B64D 1/22
244/118.1
5,739,615 A * 4/1998 McClelland ............ H02K 1/24
310/186

(Continued)

FOREIGN PATENT DOCUMENTS

| CN | 101505083 A | 8/2009 |
| JP | H11113229 | 4/1999 |
| WO | 02073778 | 9/2002 |

OTHER PUBLICATIONS

Written Opinion and International Search Report of corresponding PCT Application No. PCT/CA2016/050396.

*Primary Examiner* — Thienvu V Tran
*Assistant Examiner* — Bart Iliya
(74) *Attorney, Agent, or Firm* — Bereskin & Parr LLP/S.E.N.C.R.L., S.R.L.

(57) ABSTRACT

A switched reluctance machine has a stator core salient with stator poles disposed concentrically with a rotor that is salient with rotor poles. A plurality of coil windings are wound about the stator core so that a pair of windings are adjacent each of the stator poles. The pair of coil windings induces magnetic flux in the adjacent stator poles and the rotor rotates to align the rotor poles with the stator poles having the induced magnetic flux. The rotor is rotatable at high speeds of up to 50,000 RPM and the coil windings can be directly cooled.

25 Claims, 11 Drawing Sheets

(51) Int. Cl.
  *H02K 15/16* (2006.01)
  *H02K 9/02* (2006.01)
  *H02K 1/24* (2006.01)
  *H02K 1/14* (2006.01)
  *H02K 15/02* (2006.01)
  *H02K 15/095* (2006.01)
  *H02K 19/12* (2006.01)

(52) U.S. Cl.
  CPC .............. *H02K 9/02* (2013.01); *H02K 15/022* (2013.01); *H02K 15/095* (2013.01); *H02K 15/165* (2013.01); *H02K 19/12* (2013.01)

(58) Field of Classification Search
  CPC .......... H02K 1/148; H02K 1/246; H02K 3/28; H02K 9/02
  See application file for complete search history.

(56) References Cited

U.S. PATENT DOCUMENTS

| | | | | |
|---|---|---|---|---|
| 5,852,334 | A  * | 12/1998 | Pengov | H02K 19/103 310/168 |
| 2008/0272664 | A1 * | 11/2008 | Flynn | H02K 21/44 310/154.01 |
| 2008/0278010 | A1 * | 11/2008 | Ishikawa | H02K 19/103 310/51 |
| 2009/0134734 | A1 * | 5/2009 | Nashiki | H02K 21/145 310/162 |
| 2013/0270937 | A1 * | 10/2013 | Rasmussen | H02K 9/19 310/54 |
| 2016/0336841 | A1 * | 11/2016 | Nagorny | H02K 19/103 |

\* cited by examiner

SWITCHED RELUCTANCE MACHINE WITH TOROIDAL WINDING

CROSS-REFERENCE TO RELATED APPLICATION

This application claims the benefit of U.S. Provisional Patent Application No. 62/143,282 filed Apr. 6, 2015, the contents of which are incorporated herein by reference.

FIELD

The described embodiments relate generally to electric machines, and in particular switched reluctance machines.

BACKGROUND

Electric machines have been applied as motors and generators in a wide range of industries for more than a century. A reluctance machine is an electric machine in which torque is produced by the tendency of the movable part of the machine to move into a position where the inductance of an excited winding is maximized. A switched reluctance machine is a type of a reluctance machine where the windings are energized as a function of the position of the movable part of the machine.

Conventional switched reluctance machines typically utilize a stator with windings on the stator teeth to generate an electromagnetic field so that a rotor in the electromagnetic field has the tendency to align with the stator to achieve maximum inductance. The rotor rotates as long as the excitation of the windings on the stator teeth switches successfully.

SUMMARY

In some aspects, embodiments described herein provide a switched reluctance machine. The switched reluctance machine includes a stator having a stator core that is salient with stator poles, a plurality of coil windings around the stator core, and a rotor that is salient with rotor poles, where the rotor disposed concentrically with the stator. Each stator pole may be excitable by a corresponding pair of the coil windings that includes a first coil winding around the stator core adjacent to a first side of the stator pole and a second coil winding around the stator core adjacent to a second side of the stator pole, the corresponding pair of the coil windings configured to induce magnetic flux through that stator pole to excite that stator pole, and the rotor can be rotatable to align the rotor poles with excited stator poles.

In some examples, for each corresponding pair of the coil windings the first coil winding corresponds to a first phase, the second coil winding corresponds to a second phase, and the first phase and the second phase have partially overlapping active periods.

In some examples, each coil winding in the plurality of coil windings corresponds to a different phase.

In some examples, for each corresponding pair of the coil windings the first coil winding and the second coil winding correspond to the same phase.

In some examples, the stator may include a plurality of joined stator segments where each stator segment includes at least one of the stator poles.

In some examples, each stator segment can include one stator pole.

In some examples, each stator segment may have an alignment guide that is mateable with a corresponding alignment guide of an adjacent stator segment.

In some examples, each coil winding may have an outer winding portion on an outer side of the stator core that is configured to be cooled.

In some examples, the switched reluctance machine may also include at least one cooling channel. The outer winding portion of each coil winding can be adjacent to at least one of the cooling channels.

In some examples, the switched reluctance machine may also include a housing substantially enclosing the stator, rotor and the plurality of coil windings.

In some examples, the rotor may be configured to rotate at more than 5,000 RPM. In some examples, the rotor may be configured to rotate at up to at least 50,000 RPM.

In some aspects, embodiments described herein provide a method of manufacturing a switched reluctance machine. The method may include providing a stator having a stator core that is salient with stator poles, winding a plurality of coil windings about the stator core such that for each stator pole there is a corresponding pair of the coil windings adjacent to that stator pole, each corresponding pair of coil windings including a first coil winding around the stator core adjacent to a first side of the corresponding stator pole and a second coil winding around the stator core adjacent to a second side of the corresponding stator pole, and each corresponding pair of coil windings can be configured to excite the corresponding stator pole by inducing magnetic flux through that stator pole, and disposing a rotor that is salient with rotor poles concentrically with the stator.

In some examples, providing the stator can include providing a plurality of stator segments, each stator segment having a stator core segment and at least one of the stator poles, and joining the stator core segments to form the stator. At least one of the coil windings can be wound about a corresponding stator core segment prior to joining the stator core segments.

In some examples, all of the coil windings can be wound about corresponding stator core segments prior to joining the stator core segments.

In some examples, the at least one stator segment can include one stator pole and a pair of adjacent stator core segments, and for the at least one stator segment a coil winding can be wound about each adjacent stator core segment prior to joining the stator core segments.

In some examples, the method may further include mating each stator core segment with an adjacent stator core segment prior to joining the stator core segments.

In some examples, the method may further include disposing a cooling channel adjacent at least one of the coil windings.

In some examples, the method may further include providing a housing substantially enclosing the stator, rotor and the plurality of coil windings.

In some aspects, embodiments described herein provide a method of operating a switched reluctance machine having a rotor that is salient with rotor poles and a stator having a stator core that is salient with stator poles. The method may include concurrently providing electrical current to a first coil winding around the stator core adjacent a first side of a particular stator pole and to a second coil winding around the stator core adjacent a second side of the particular stator pole to induce magnetic flux in the particular stator pole, and aligning one of the rotor poles to the particular stator pole to provide a motor operation in the switched reluctance machine.

In some examples, the stator poles may include a sequence of stator poles. The method may further include determining a position of the rotor poles, sequentially inducing magnetic flux in the stator poles based on the position of the rotor poles, where the magnetic flux in each stator pole is induced by providing electrical current to a particular first coil winding around the stator core adjacent a particular first side of that stator pole and to a particular second coil winding around the stator core adjacent a particular second side of that stator pole, and aligning the rotor poles with the stator poles to provide the motor operation.

In some examples, for each stator pole, the first coil winding and the second coil winding adjacent that stator pole may correspond to the same phase.

In some examples, for each stator pole, the first coil winding adjacent that stator pole may correspond to a first phase, the second coil winding adjacent that stator pole may correspond to a second phase, and the electrical current can be provided to the first phase and the second phase for a partially overlapping period.

In some examples, the rotor may rotate at more than 5,000 RPM to align the one of the rotor poles to the particular stator pole.

In some examples, the rotor may rotate at up to at least 50,000 RPM to align the one of the rotor poles to the particular stator pole.

In some examples, the method may further include directly cooling at least one of the first coil winding and the second coil winding.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

Several embodiments of the present invention will now be described in detail with reference to the drawings in which.

Figure 1:
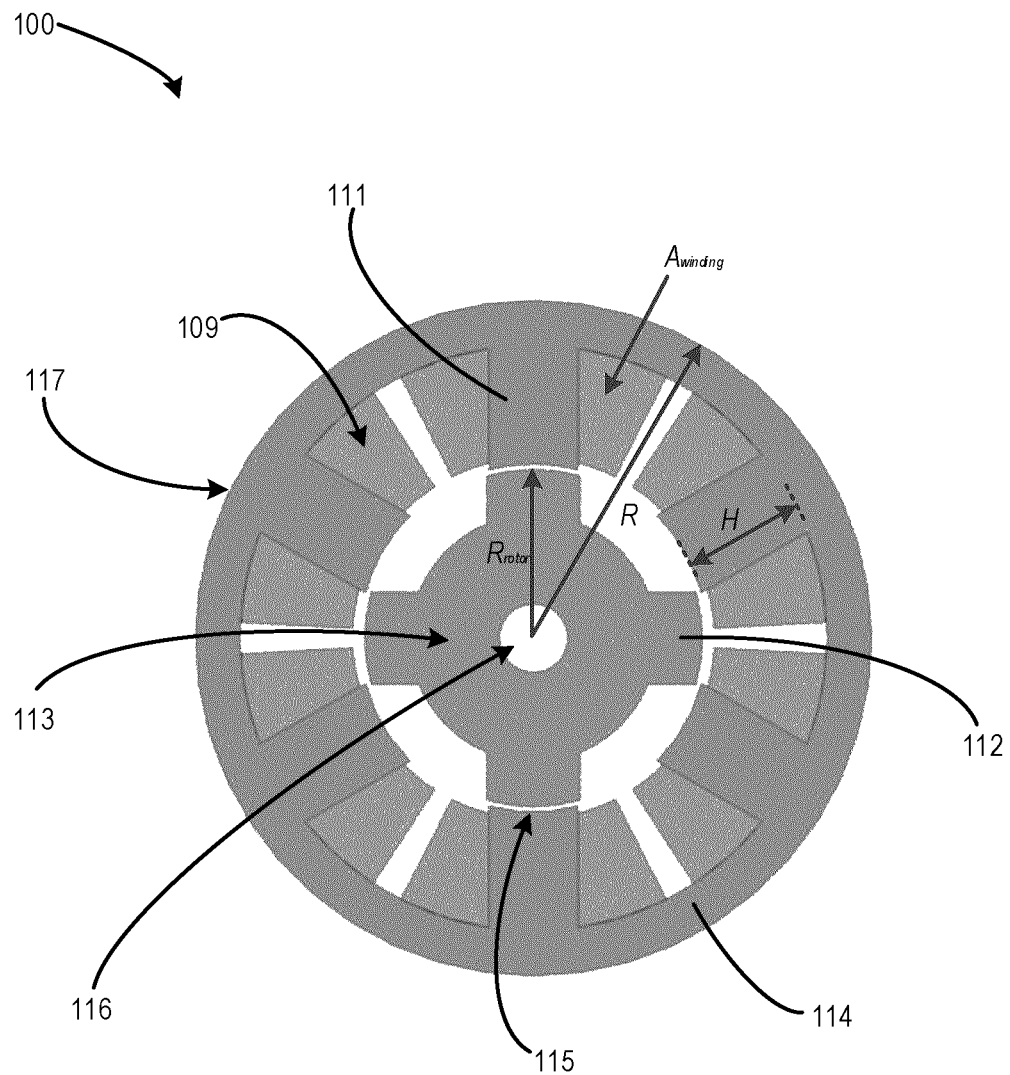
FIG. 1 shows a cross-sectional view of a switched reluctance machine with stator teeth windings.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

The term "and/or" as used herein means that the listed items are present, or used, individually or in combination. In effect, this term means that "at least one of" or "one or more" of the listed items is used or present.

The various embodiments described herein relate to switched reluctance machines, and in particular switched reluctance machines using coil windings around the stator core, also referred to herein as toroidal core windings. In some cases, the toroidal winding techniques described in the example embodiments herein may also be applied to other machine technologies in addition to switched reluctance machines, such as interior permanent magnet machines, surface permanent magnet machines, and induction machines.

Switched reluctance machines (SRMs) are growing in popularity in automotive and other industries. Switched reluctance machines as described in embodiments herein can be attractive because they tend to have fewer components, can be easy to manufacture, and may provide robust operation under extreme temperature conditions. Also, because switched reluctance machines do not incorporate permanent magnets, it can be more economical to manufacture SRMs.

The embodiments described herein employing toroidal core windings may reduce the material required for the stator core and the copper windings of SRMs. This may reduce copper loss and stator core loss as compared to an equivalent traditional SRM machine, as well as achieve higher power to weight and torque weight ratios. Furthermore, the thermal properties of the SRM may also be improved. As a result, embodiments described herein may provide improved function at high speeds such as greater than 25,000 RPM for example and, in some cases, up to at least about 50,000 RPM and more.

Embodiments of the SRMs described herein may be suited to variable speed and high speed applications, for instance because they do not incorporate any permanent magnets. Embodiments of the SRMs described herein may also provide low-noise sensitivity at high speeds.

In general, embodiments of the switched reluctance machines described herein include a stator disposed concentrically with a rotor. The stator can have a stator core with a plurality of stator teeth or poles. The rotor may also include a plurality of rotor poles. To operate the switched reluctance machine, an electromagnetic field is generated using coil windings. The coil windings excite one or more stator poles, and the rotor in the electromagnetic field has the tendency to align the rotor poles with the excited stator poles to achieve maximum inductance. Different coil windings may be energized at different times so that different stator poles are excited based on the position of the rotor. The rotation of the rotor may in turn provide a motor operation.

In embodiments described herein, the coil windings may be provided around the stator core, adjacent to the stator poles, rather than wound around the stator poles themselves. Each stator pole may have a pair of coil windings wound around the core on either side of that stator pole. The pair of coil windings can be used to generate an electromagnetic field to excite that stator pole and induce magnetic flux through the stator pole. In response, the rotor may tend to align the rotor poles with the excited stator poles.

As used herein, the coil windings around the stator core may be referred to as toroid cord windings. Embodiments described herein using toroid core windings may reduce the copper volume of switched reluctance machines. Accordingly, some such embodiments may also reduce the copper loss of the machine. The embodiments described herein may also be used to reduce the stator core material. This may in turn reduce core loss of the machine. Accordingly, in some example embodiments the thermal performance of the machine may be improved as a result of these reduced losses. The overall weight of the machine may also be reduced as a result of the reduction in material required for the stator and for the windings.

Referring now to FIG. 1, shown therein is an example of a switched reluctance machine 100. Switched reluctance machine 100 includes a rotor 113 with a plurality of rotor teeth or poles 112. Machine 100 also includes a stator 117 having a stator core 114 with a plurality of stator teeth or poles 111. An air gap 115 is also provided between the rotor poles 112 and the stator poles 111. Machine 100 also includes a bore 116 for a shaft. Switched reluctance machine 100 is an example of a six stator pole and four rotor pole switched reluctance machine with an example of conventional core winding design. That is, the stator 117 has coil windings 109 around each stator tooth 111.

Figures 2A, 2B:
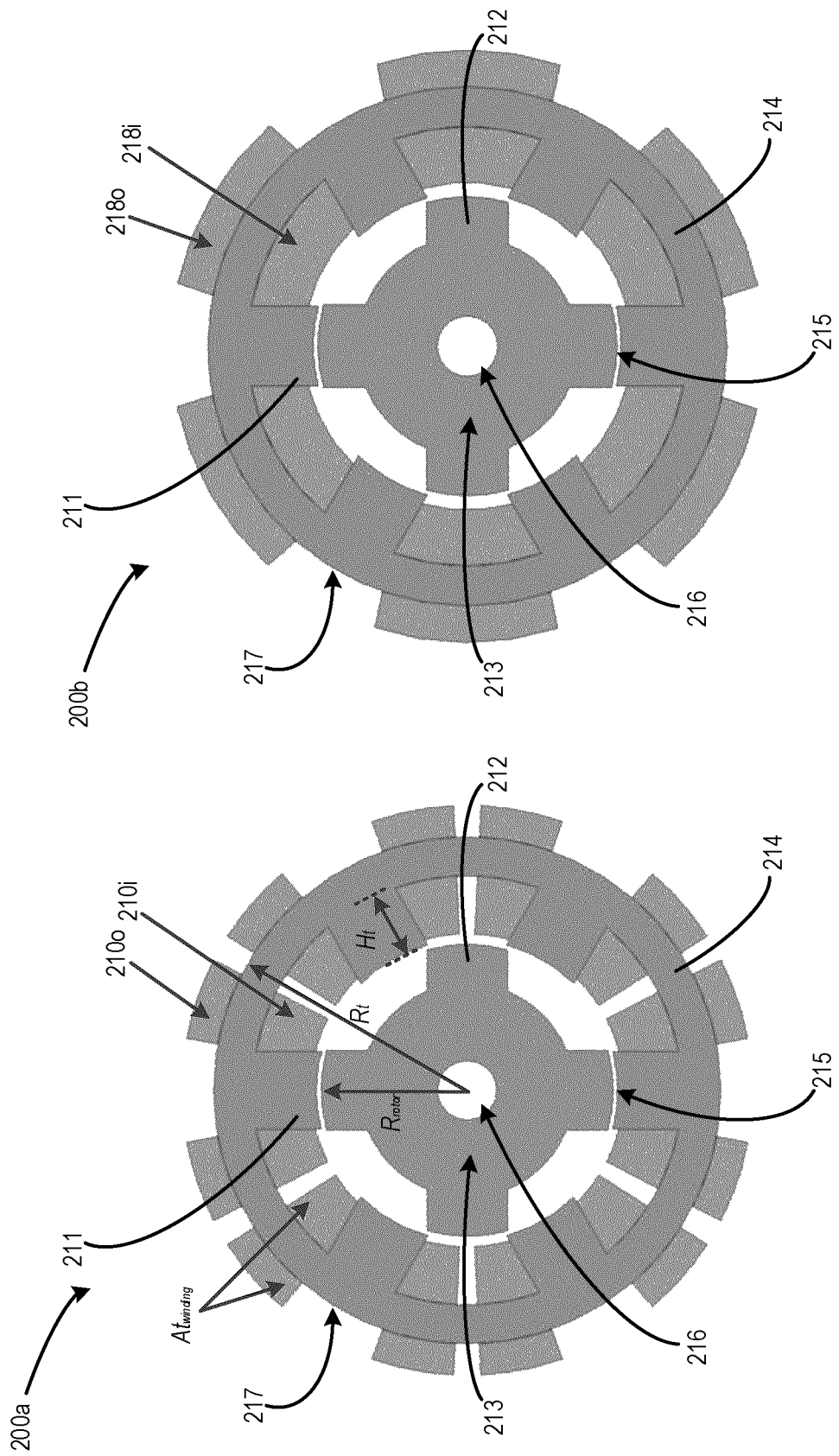
FIG. 2A shows a cross-sectional view of a switched reluctance machine in accordance with an example embodiment.
FIG. 2B shows a cross-sectional view of a switched reluctance machine in accordance with another example embodiment.

Referring now to FIG. 2A, shown therein is an example embodiment of a switched reluctance machine 200a. Switched reluctance machine 200a is an example of a switched reluctance machine implemented using an example of the toroid core winding technique. While the example switched reluctance machine 200a shown in FIG. 2A has a six stator pole and four rotor pole combination, one skilled in the art will appreciate that other combinations of stator poles and rotor poles may also be suitable.

Machine 200a includes a stator 217 and a rotor 213. The rotor 213 is disposed concentrically with the stator 217. The stator 217 has a stator core 214 (also referred to as the stator back iron) that is salient with stator poles 211. The rotor 213 is salient with rotor poles 212. An air gap 215 is also provided between the stator poles 211 and the rotor poles 212. The machine 200a also has a shaft bore 216. The rotor 213 can be mounted on a shaft passing through the bore 216. Machine 200a has a plurality of coil windings 210. Electrical current can be provided to the coil windings 210 to induce an electromagnetic field. The coil windings 210 can thereby excite the stator poles 211 by inducing magnetic flux in the stator poles 211. The rotor 213 can be rotatable to align the rotor poles 212 with excited stator poles 211.

The coil windings 210 are wound around the stator core 214. Each coil winding 210 is adjacent to one of the stator poles 211. For each stator pole 211, a corresponding pair of the coil windings 210 are wound around the stator core 214 adjacent to that stator pole 211. Each stator pole 211 has a first coil winding 210 around the stator core 214 adjacent to a first side of the stator pole 211 and a second coil winding 210 around the stator core 214 adjacent to a second side of the stator pole 211. The pair of coil windings 210 corresponding to a particular stator pole 211 may be configured to induce magnetic flux through that stator pole 211, as will be discussed in further detail below with references to FIGS. 3A-3B.

Machine 200a can be generally implemented to achieve comparable performance to the machine 100. The rotor diameter $R_{rotor}$ of the rotor 213 of machine 200a can also be similar to the rotor diameter $R_{rotor}$ of rotor 113 of machine 100. In machine 200a, each coil winding 210 has an inner winding portion 210i on the inward side of the stator core 214. Each coil winding 210 also has an outer winding portion 210o outward of the stator core 214. In machine 200a, the coil windings 210 are not provided around the stator teeth 211. And, since the outer winding portion 210o is on the outward side of the stator core 214, the inner winding portions 210i on the inward side of the stator core 214 may have a smaller area as compared with conventional windings.

The stator tooth height $H_t$ of machine 200a can be made smaller than the stator tooth height H of a similarly configured machine 100. A reduced stator tooth height $H_t$ may permit the exterior diameter (as shown by stator core radius $R_t$) of the stator core 214 to be reduced as compared to the exterior diameter (stator core radius R) of the stator core 114 shown in FIG. 1. Reducing the stator tooth height $H_t$ may not only reduce the cross sectional area of the stator core 214 (by reducing the exterior diameter), but may also reduce the flux path in the stator core 214. In embodiments where the flux path in the stator core is reduced, the stator core loss of the machine may also be reduced.

Implementations of machine 200a having the same stack length as a machine 100 may also reduce the volume of copper winding material and stator core materials required. As a result, the power to weight and torque to weight ratios of machine 200a may be improved. Furthermore, because the outer winding portion 210o that includes about half of the coil winding 210 is outside the stator core 214, absorption of the copper loss generated by the windings 210 may be simplified, as will be discussed in further detail below.

Referring now to FIG. 2B, shown therein is switched reluctance machine 200b in accordance with another example embodiment. Switched reluctance machine 200b generally corresponds to switched reluctance machine 200a, with the notable difference that each coil winding 218 is adjacent two stator poles 211. That is, each coil winding 218 is wound around the stator core 214 and the windings 218 span between two stator poles. In other words, each coil winding forms part of two different pairs of coil windings that correspond to two different stators.

As will be discussed below with reference to FIG. 3, in switched reluctance machine 200b the pair of coil windings 218 adjacent a particular stator pole 211 may correspond to different phases. In contrast, the pair of the coil windings 210 adjacent a particular stator pole in switched reluctance machine 200a may correspond to the same phase.

The coil windings 210 and 218 can be used to generate an electromagnetic field. By concurrently providing electrical current through a pair of coil windings 210/218 adjacent a stator pole 211 the stator pole can be excited by inducing magnetic flux through that stator pole 211. That is, electrical current can be concurrently provided to a first coil winding 210/218 wound around the stator core 214 adjacent a first side of a particular stator pole 211 and to a second coil winding 210/218 around the stator core 214 adjacent a second side of the particular stator pole 211 to induce the magnetic flux in the particular stator pole 211. The flux can penetrate the air gap 215 between the stator poles 211 and the rotor poles 212 and then go into the rotor 213. The flux between the exciting or energized stator poles 211 and the corresponding rotor poles 212 tends to align the rotor poles 212 with the stator poles 211 so that the rotor 213 rotates. This can provide the motoring operation in the switched reluctance machines 200a/200b.

The flux can split by half into the back iron of the rotor 213 merge again at the other end of the rotor pole 212. The flux then again goes through the rotor pole 212, the air gap 215, and the stator pole 211 on the other side of the rotor 213. Eventually, the flux splits in the stator back iron 214 and merges at the base of the stator pole 211 where the flux is generated. The flux paths described herein, are for illustration purposes only. In fact, there is neither a starting point nor an ending point of the flux path. The whole flux path is an entire loop formed by the entirety of the switched reluctance machines 200a. Machine 200b operates in a similar manner.

Figures 3A, 3B:
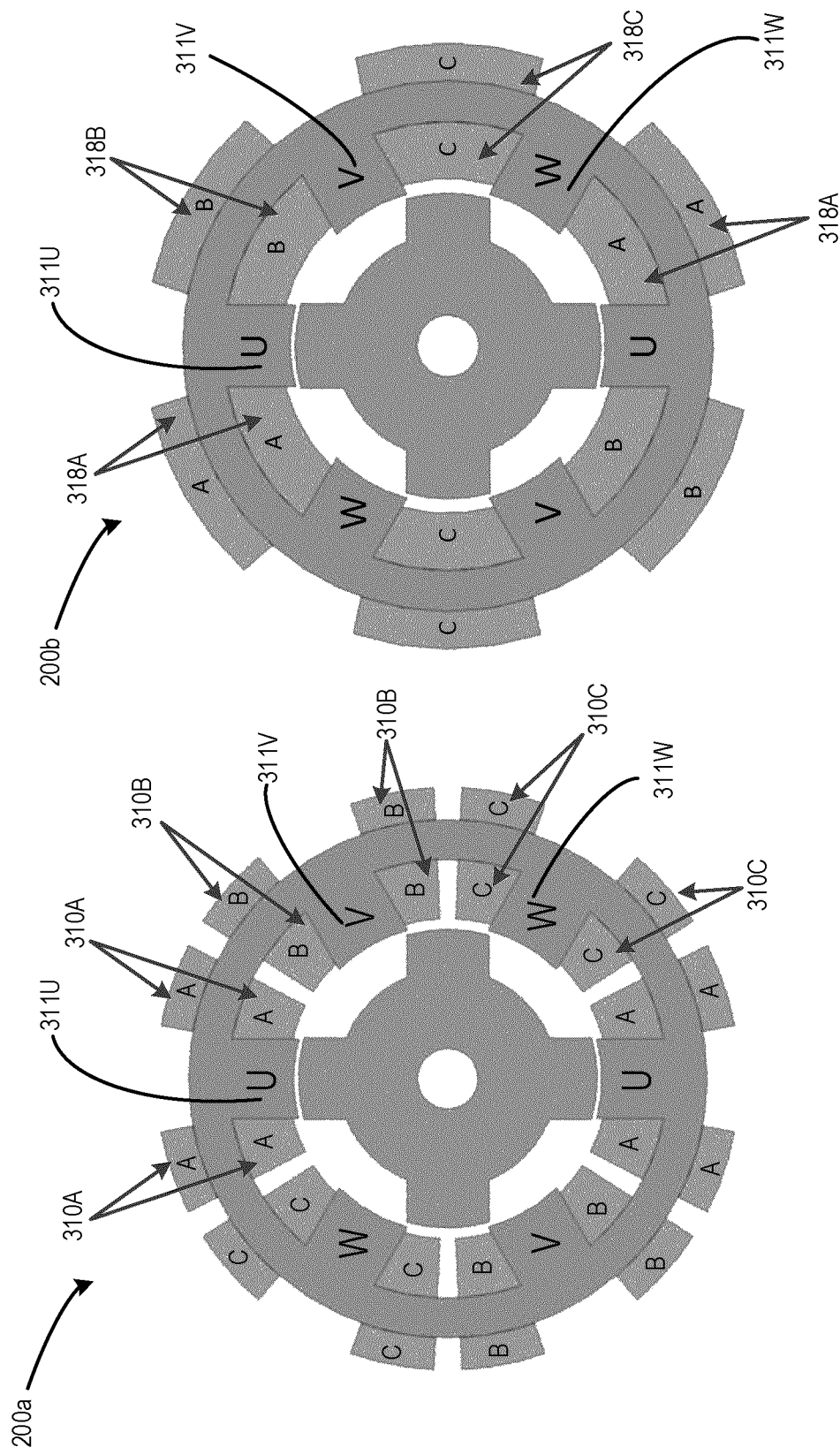
FIG. 3A shows a cross-sectional view of the switched reluctance machine of FIG. 2A with phase information illustrated in accordance with an example embodiment.
FIG. 3B shows a cross-sectional view of the switched reluctance machine of FIG. 2B with phase information illustrated in accordance with an example embodiment.

Referring now to FIG. 3A, shown therein is an illustration of example phase information for the switched reluctance machine 200a. In the example shown in FIG. 3A, the coil windings 310 of switched reluctance machine 200a correspond to three different phases A, B and C, although other embodiments may employ a different number of phases. In switched reluctance machine 200a, each pair of the coil windings 310 adjacent to a particular stator pole 311 correspond to the same phase. Accordingly, to energize a particular stator pole 311, the windings for the phase corresponding to that stator pole 311 can be activated.

For example, the coil windings 310A adjacent stator pule 311U correspond to a phase 'A'. Similarly, the coil windings 310B adjacent stator pole 311V correspond to a phase 'B', and the coil windings 310C adjacent stator pole 311W correspond to a phase 'C'. To excite stator pole 311U, electrical current can be provided in phase A to energize windings 310A. To excite stator pole 311V, electrical current can be provided in phase B to energize windings 310B. To excite stator pole 311W, electrical current can be provided in phase C to energize windings 310C.

In some embodiments of machine 200a, only one phase may need to be active at any given time. Embodiments of machine 200a may be implemented using 3-phase asymmetric converters. Machine 200a may also use phase activation or energizing sequences corresponding to conventionally wound machines such as machine 100. In embodiments of machine 200b, at least two phases may need to be active at any given time. In some cases, all of the coils may be active at any given time in implementations using twelve switch bidirectional converters. In some embodiments of machine 200a, to generate an equivalent magnetic field for a particular stator pole 311, the number of turns per coil used for machine 100 and machine 200a may be the same, however the number of turns per phase in machine 200a may be twice the number of turns per phase in machine 100 (because there are a pair of windings adjacent each stator pole corresponding to each phase).

In other embodiments modified drive systems and control methods, the number of turns required for machine 200a and machine 200b may be significantly minimized to achieve the same performance as 100. In contrast, the number of turns required for machine 100 typically cannot be changed.

For switched reluctance machine 200a, the coil windings 310 that are excited can change phase from one stator pole 311 (i.e. the pair of coil windings 310 adjacent one stator pole) to another in sequence according to the rotor position so that the motor keeps rotating. To operate the switched reluctance machine 200a, the position of the rotor poles 212 may be determined. Then, based on the position of the rotor poles 212 electrical current can be provided in a particular phase, i.e. to the pair of coil windings adjacent each stator pole 211 in sequence. Because the excited stator poles 211 change in sequence, the rotor 213 may continue to rotate to align the rotor poles 212 with the excited stator poles 211 to provide the ongoing motoring operation.

Referring now to FIG. 3B, shown therein is an illustration of example phase information for the switched reluctance machine 200b. Once again, the coil windings 318 correspond to three different phases 'A', 'B' and 'C'. However, for each pair of coil windings 318 corresponding to a particular stator pole 311, the first coil winding 318 corresponds to a first phase and the second coil winding 318 corresponds to a second phase that is different from the first phase. For instance, for stator pole 311U, the first coil winding 318A corresponds to phase A, while the second coil winding 318B corresponds to phase B. As such, to induce magnetic flux in the stator pole 311U, electrical current can be provided to both phase A and phase B to energize phase A winding 318A and phase B winding 318B.

As with machine 200a, as the rotor rotates different stator poles 311 may be excited based on the position of the rotor poles. To induce magnetic flux in stator pole 311V, electrical current can still be provided to phase B coil windings 318B, while electrical current can also be provided to phase C coil windings 318C, while phase A windings 318A may then become inactive. Similarly, to induce magnetic flux in stator pole 311W, electrical current can be provided to phase A and phase C coil windings 318A and 318C, while phase B coil windings 318B are inactive. In some embodiments of machine 200b, two phases may be energized at all times during the motoring operation.

In machine 200b, at least two phases may be active at any time (for example phase A and B, although in some cases machine 200b may be designed to have all phases active at all times using appropriate drive system design and control techniques) while in machine 200a typically only one phase will be active at a given time. As a result, in embodiments of machine 200b the coil windings 218 may generate higher magnetic flux and accordingly achieve higher performance than machine 100 and even machine 200a. However, control of machine 200a may be easier than control of machine 200b. As a result, in some embodiments machine 200a may permit a more simplified drive system and control design as compared to machine 200b. For instance, in some embodiments machine 200a may be implemented using conventional drive system and control designs that may be applied with machine 100.

Figure 10:
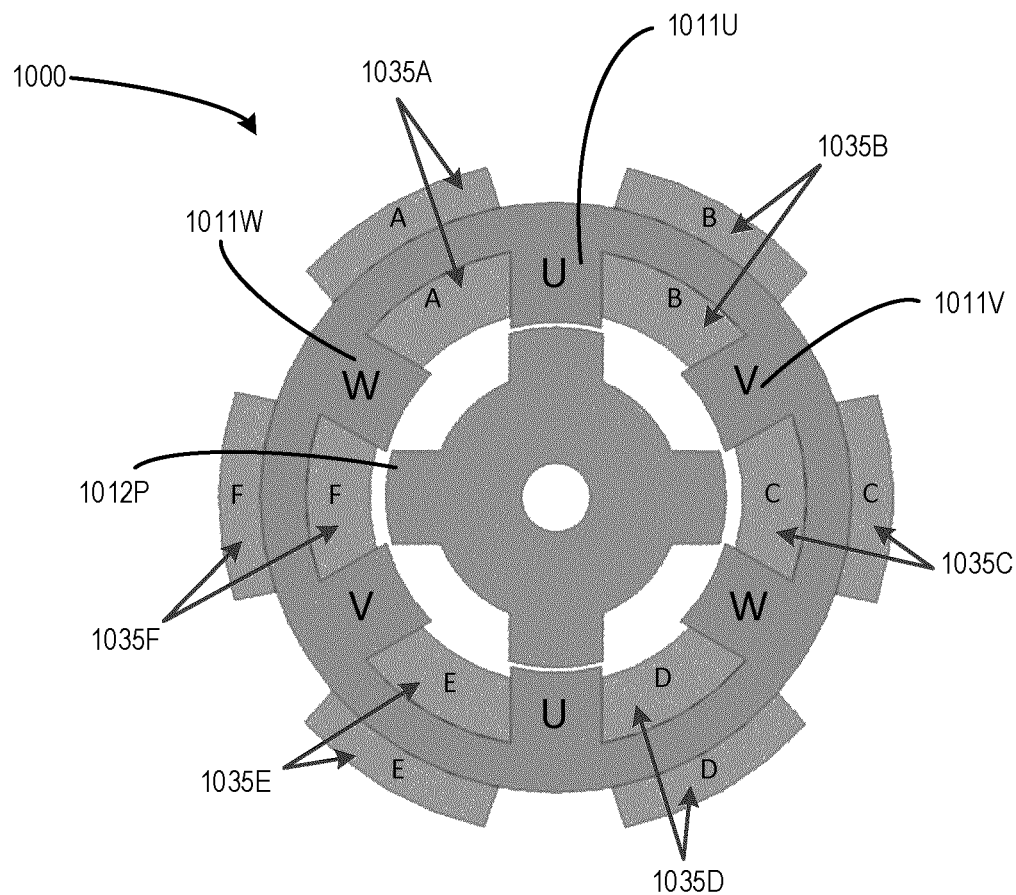
FIG. 10 shows a cross-sectional view of another example switched reluctance machine with phase information illustrated in accordance with an example embodiment.

Referring now to FIG. 10, shown therein is another example embodiment of a switched reluctance machine 1000. Switched reluctance machine 1000 generally corresponds to the structure of switched reluctance machine 200b, with the notable different that each of the coil windings 1035A-1035F correspond to different phases.

Figure 11:
FIG. 11 shows an example of a drive circuit that may be implemented with the switched reluctance machine of FIG. 10 in accordance with an example embodiment.

Referring now to FIG. 11, shown therein is an example circuit diagram of a drive circuit 1000 that may be implemented with switched reluctance machine 1000. Each of the coil windings 1035A-1035F can be independently wound and coupled to a converter as shown in drive circuit 1100. In operation, to align rotor pole 1012P with stator pole 1011W, switches S1 and S10 in drive circuit 1100 can be activated.

The configuration of coil windings 1035 of machine 1000 and drive circuit 1100 may provide improved performance as compared to conventional machines, such as machine 100. Although the example shown in FIGS. 10 and 11 illustrates a 6 stator pole and 4 rotor pole machine and its drive system, this coil winding and drive system configuration may be applied with different implementations of switched reluctance machines, having different numbers of stator poles and rotor poles.

The various embodiments described herein may also be used to provide high-speed switched reluctance motors. For instance, the rotors 213 of switched reluctance machines 200a/200b may be configured to rotate at more than 5,000 RPM. In some embodiments, the rotors 213 of switched reluctance machines 200a/200b may be configured to rotate at greater than 25,000 RPM. In some further embodiments, the rotors 213 of switched reluctance machines 200a/200b may be configured to rotate at greater than 50,000 RPM.

To manufacture the switched reluctance machines 200a/200b, the stator 217 having a stator core 214 that is salient with stator poles 211 can be provided. A plurality of coil windings 210/218 may then be wound about the stator core 214 such that a corresponding pair of the coil windings 210/218 is adjacent to each stator pole 211. Each corresponding pair of coil windings 210/218 can include a first coil winding 210/218 around the stator core 214 adjacent to a first side of a particular corresponding stator pole 211 and a second coil 210/218 winding around the stator core 214 adjacent to a second side of the particular corresponding stator pole 211. The pair of coil windings 210/218 corresponding to a particular stator pole 211 can be configured to excite the particular corresponding stator pole 211 by inducing magnetic flux through that stator pole 211. A rotor 213 that is salient with rotor poles 212 can be disposed concentrically with the stator 217 to provide the switched reluctance machine.

In some cases, manufacturing a switched reluctance machine with the toroid core winding may be more difficult to realize compared to traditional winding technology. Accordingly, segmented stators may be used to reduce the winding complexity, as discussed below with references to FIGS. 4-6F. For example, for a switched reluctance machine with six stator poles, the stator may be provided by two segments each having six stator poles, six segments each having a single stator pole, or even three segments each having two stator poles. The coil windings for each stator segment may be wound separately and then the stator segments may be joined together to complete the stator.

In some cases, all the coil windings may be wound prior to joining the stator segments. For instance, when manufacturing a switched reluctance machine such as the switched reluctance machine 200a shown in FIG. 2A, all the coil windings 210 may be wound around stator core segments prior to joining together the stator segments. In other cases, some, but not all, coil windings may be wound prior to joining the stator segments. For instance, when manufacturing a switched reluctance machine such as the switched reluctance machine 200b shown in FIG. 2B some of the coil windings 218 may require the stator segments to be joined prior to winding, for instance where a coil winding spans a joint between stator core segments.

Figure 4:
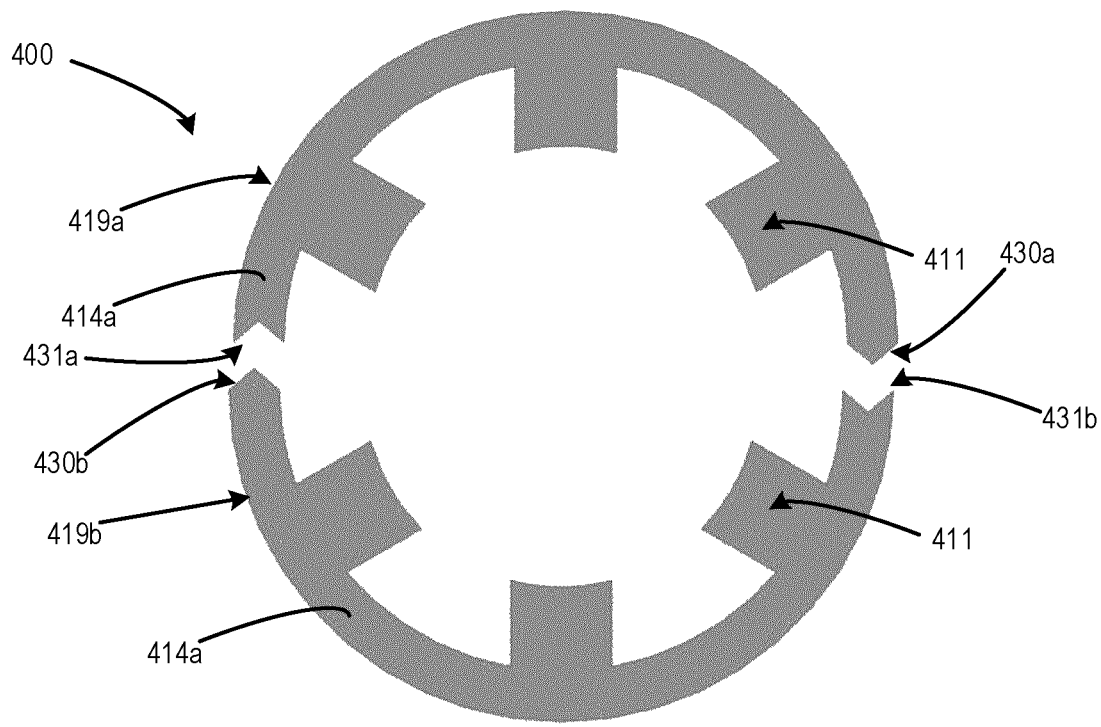
FIG. 4 shows a cross-sectional view of a stator in accordance with an example embodiment.

Referring now to FIG. 4, shown therein is an example embodiment of a segmented stator 400. Segmented stator 400 may be used to manufacture a stator such as stator 217 for switched reluctance machines 200a/200b. The stators 217 may be provided by a plurality of joined stator segments 419 that each include at least one of the stator poles 411.

Segmented stator 400 has a first stator segment 419a and a second stator segment 419b. Each stator segment 419 includes a stator core segment 414a/414b and at least one stator pole 411. In the example of segmented stator 400, each stator segment 419 includes a plurality of stator poles 411, namely three stator poles 411 per segment 419. To facilitate manufacturing, the stator segments 419 may include alignment guides 430/431. As shown in segmented stator 400, each alignment guide 430 can be mateable with a corresponding alignment guide 431 of an adjacent stator segment 419. For instance, male alignment guides 430a and 430b are configured to mate with female alignment guides 431b and 431a respectively. The triangular alignment guides 430/431 shown in FIG. 4 are merely exemplary, and a skilled reader will appreciate that other configurations for alignment guides 430/431 may also be provided.

Figure 5:
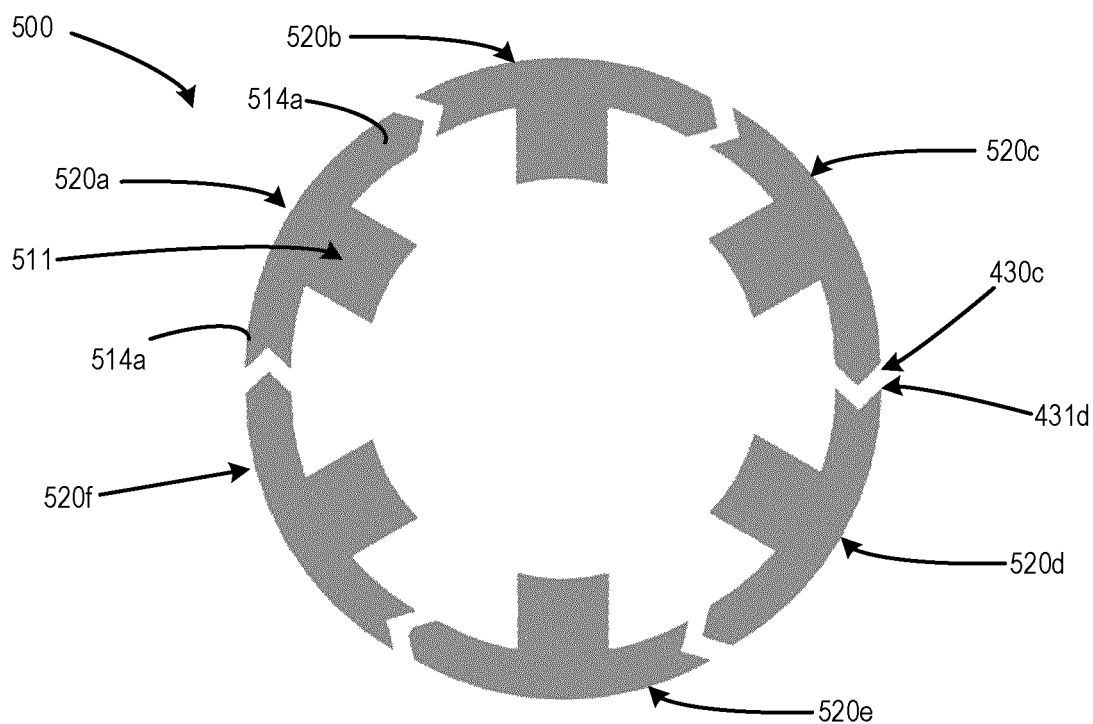
FIG. 5 shows a cross-sectional view of a stator in accordance with another example embodiment.

Referring now to FIG. 5, shown therein is another example embodiment of a segmented stator 500. Segmented stator 500 has a plurality of stator segments 520a-520f. Each stator segments 520 includes one stator pole 511 and a pair of adjacent stator core segments 514, such as stator core segments 514a of stator segment 520a. In some cases, the coil windings may be wound about each adjacent stator core segment 514 prior to joining the stator segments 520. This may occur, for example, when manufacturing switched reluctance machine 200a.

Figure 6B:
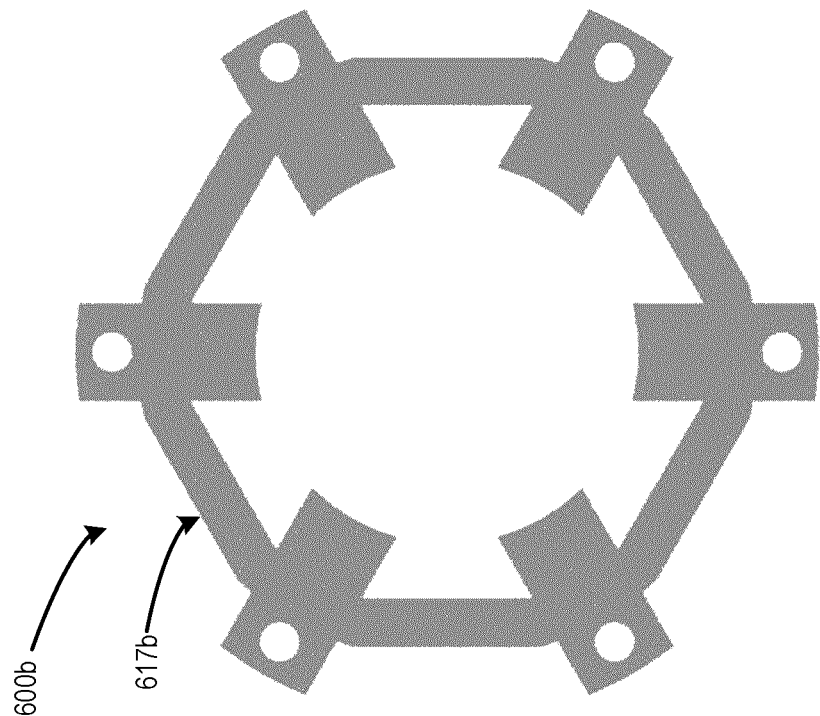
FIG. 6A-6F show cross-sectional views of stators in accordance with example embodiments.
Figure 6A:
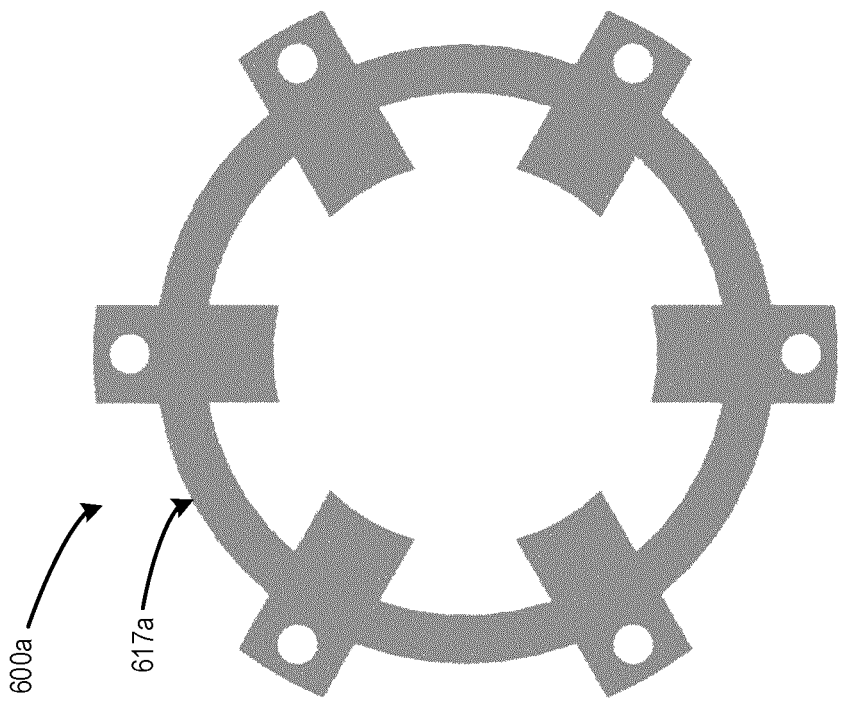

Referring now to FIG. 6A-6F, shown therein are further examples of stators that may be used in accordance with various embodiments described herein. FIGS. 6A and 6B illustrate examples of non-segmented stators 600a and 600b respectively. Stator 600a has curved stator core segments 617a, while stator 600b has substantially straight stator core segments 617. A particular straight stator core segment design may be selected to reduce the material required for the stator.

Figure 6D:
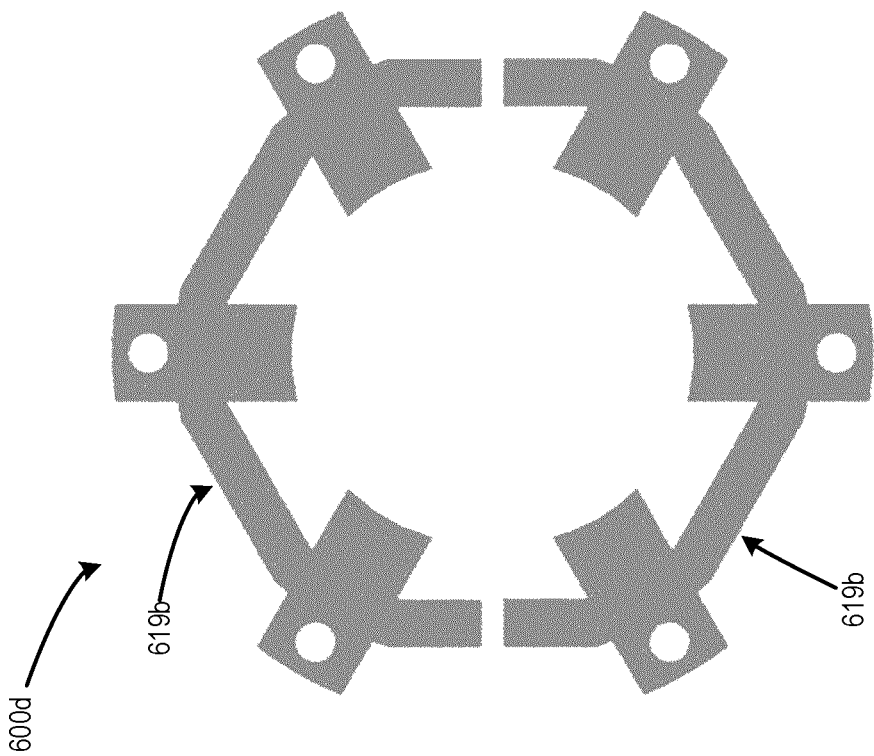
Figure 6C:
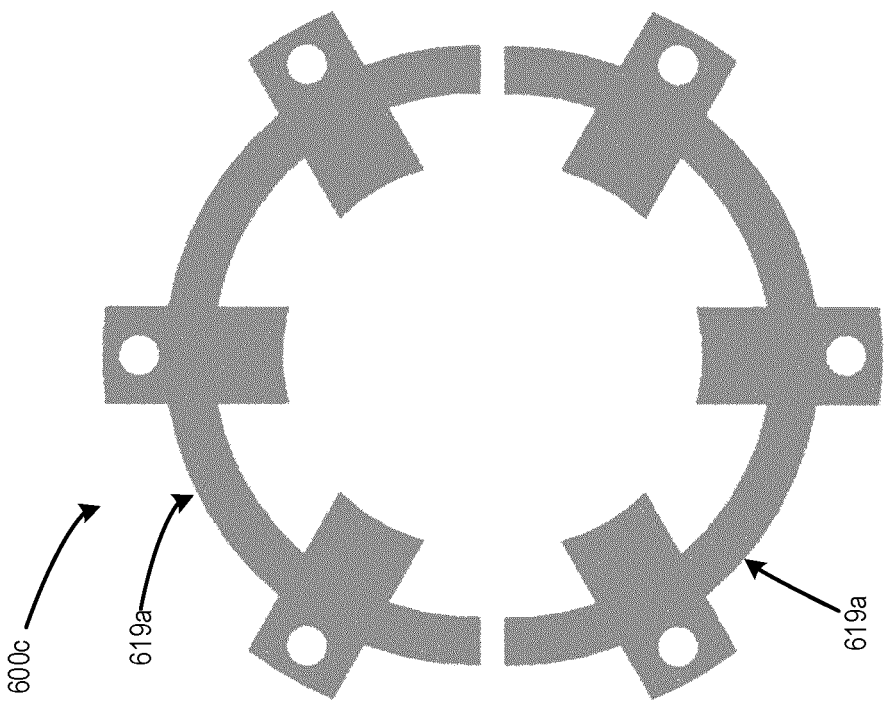

FIGS. 6C and 6D illustrate examples of segmented stators 600c and 600d, each having two stator segments 619. Segmented stators 600c and 600d are generally similar to segmented stator 400 in that they are provided as two stator segments 619. However, the segmented stators 600c and 600d do not have alignments guides such as alignment guides 430 and 431 provide by stator 400. The stator core segments 619a of segment stator 600c are curved, while the stator segments 619b of segmented stator 600d are substantially straight.

Figure 6F:
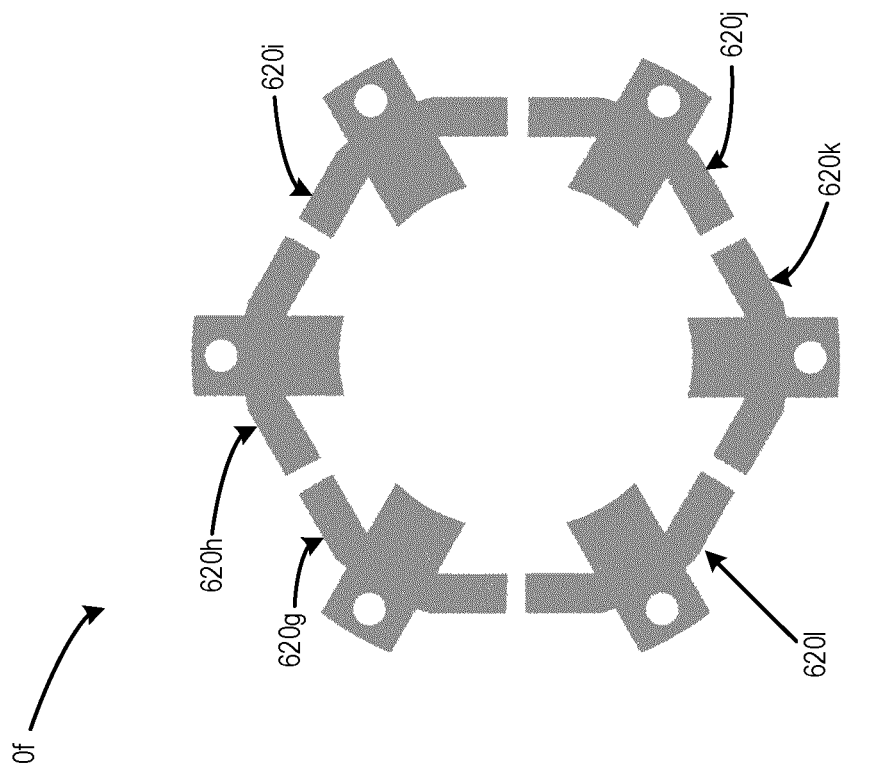
Figure 6E:
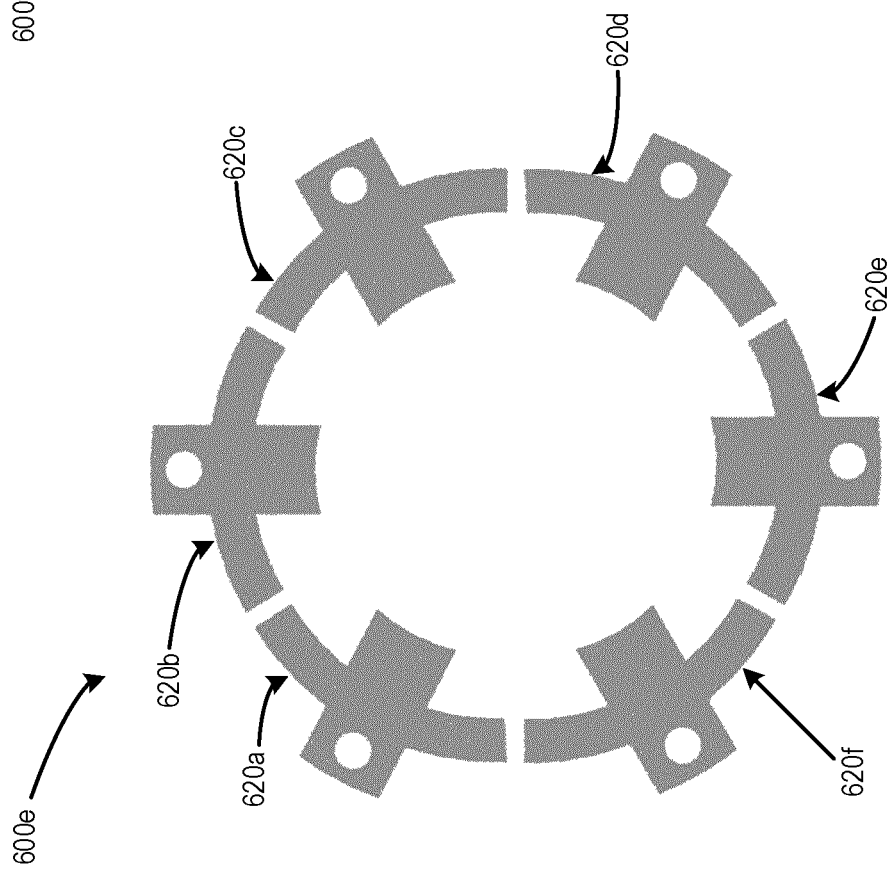

FIGS. 6E and 6F illustrate examples of segmented stators 600e and 600f, each having six stator segments 620. Segmented stators 600e and 600f are generally similar to segmented stator 500 in that they are provided as six stator segments 620. However, the segmented stators 600e and 600f do not have alignments guides such as alignment guides 530 and 531 provided by stator 500. The stator core segments 620 of segment stator 600e are curved, while the stator segments 620 of segmented stator 600f are substantially straight.

Figure 7A:
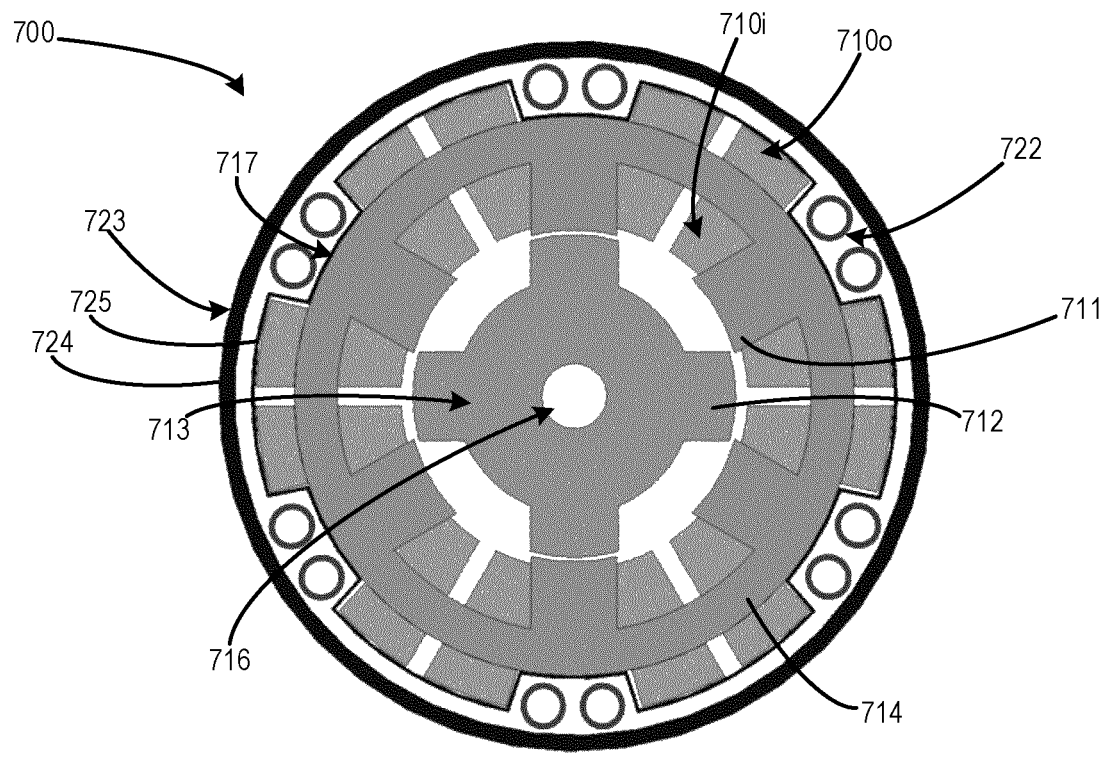
FIG. 7A shows a cross-sectional view of a switched reluctance machine in accordance with another example embodiment.

Referring now to FIG. 7A, shown therein is a cross-sectional view of a switched reluctance machine 700 in accordance with an example embodiment. The structure of the stator 717, rotor 713, and coil windings 710 of switched reluctance machine 700 are generally similar to the stator 217, rotor 213, and coil windings 210 of switched reluctance machine 200a. However, the switched reluctance machine 700 also incorporates cooling channels 722 and a casing or housing 723.

As discussed above, the windings 710 have outer winding portions 710o that are on the outer side of the stator core 714. Switched reluctance machine 700 includes cooling channels 722 provided adjacent to the outer winding portions 710o. This may improve thermal performance of switched reluctance machine 700 by providing substantially direct heat transfer between the cooling channels 722 and the coil windings 710.

In traditional switched reluctance machines, the copper loss from the coil windings often has to be transferred through an intermediate medium such as steel for heat exchange. As these intermediate mediums may have different thermal conductivity properties from the copper used for the windings, the effectiveness of the heat transfer can be diminished. By directly cooling the coil windings 710, the heat exchange properties of the switched reluctance machine 700 may be improved. This may in turn improve operation at higher speeds.

Switched reluctance machine 700 also includes a housing or casing 723. Housing 723 substantially encloses the stator 717, rotor 713 and the plurality of coil windings 710. The housing 723 can provide insulation and protection for machine 700 from the surrounding environment.

The cooling channels 722 may be integrated into the housing 723. The cooling channels 722 may be disposed between an inner surface 725 of the housing 723 and outer surface 724 of the housing 723. Each coil winding 710 may be provided adjacent one of the cooling channels 722 that are inside the casing 723.

Figure 7B:
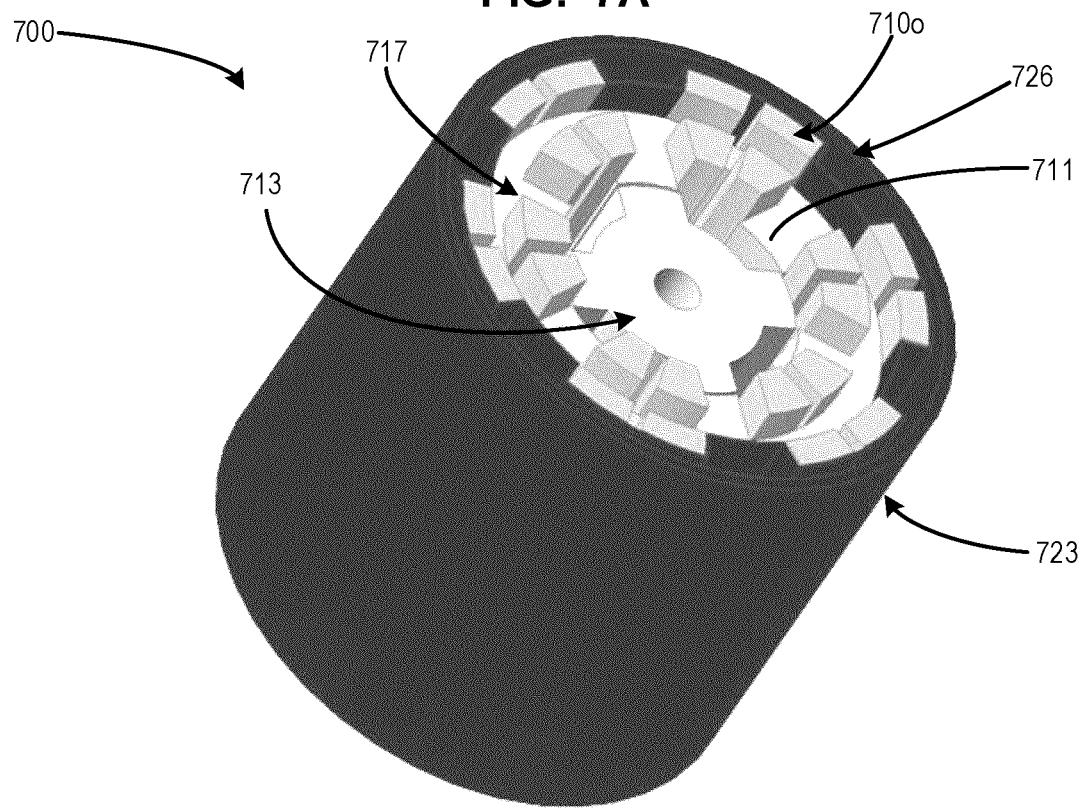
FIG. 7B shows a perspective view of the switched reluctance machine of FIG. 7A.

Referring now to FIG. 7B, shown therein is a perspective view of switched reluctance machine 700. As FIG. 7B illustrates, the housing 723 substantially encloses the rotor 713, stator 717 and windings 710. The housing 723 also includes the cooling channels between the inner surface 725 of the housing 723 and outer surface 724 of the housing 723. The position of cooling channels 722 is illustrated by 726.

Figure 8A:
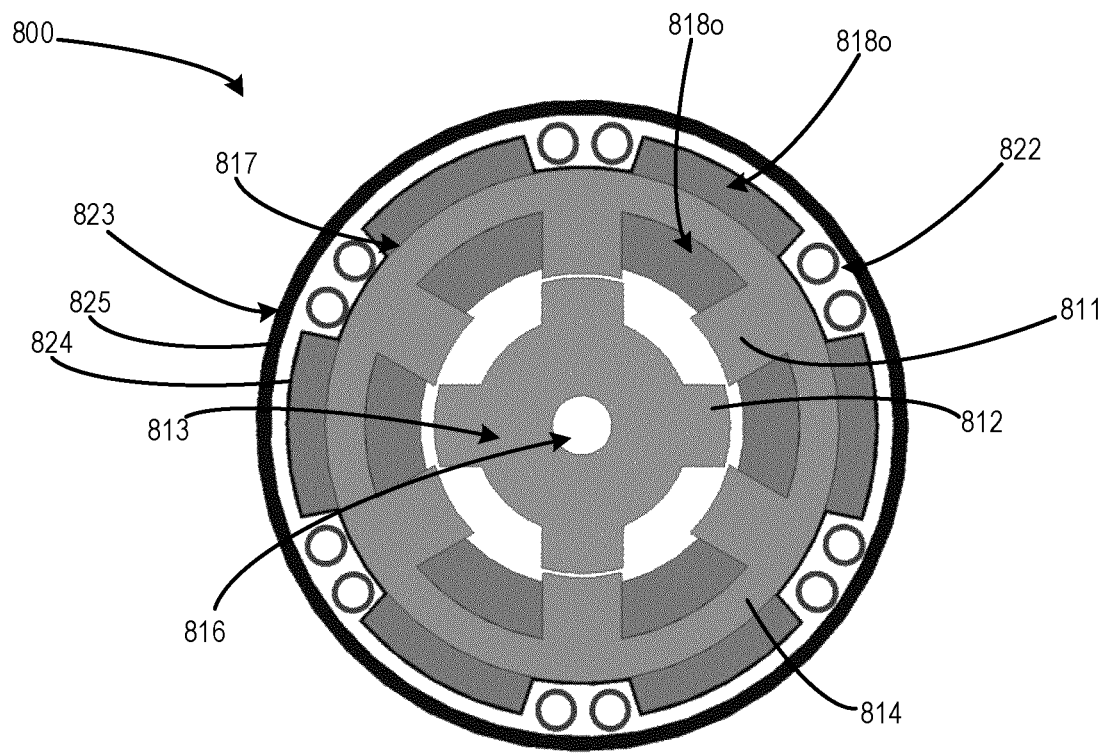
FIG. 8A shows a cross-sectional view of a switched reluctance machine in accordance with another example embodiment.

Referring now to FIG. 8A, shown therein is a switched reluctance machine 800 in accordance with another example embodiment. The structure of the stator 817, rotor 813, and coil windings 818 of switched reluctance machine 800 are generally similar to the stator 217, rotor 213, and coil windings 218 of switched reluctance machine 200b. However, as with switched reluctance machine 700, the switched reluctance machine 800 also incorporates cooling channels 822 and a casing 823.

In switched reluctance machine 800, the outer portion 818o of each coil winding 818 can be adjacent two cooling channels 822. This may provide more effective cooling for coil windings 818 that may span a longer area of the stator core 814.

Figure 8B:
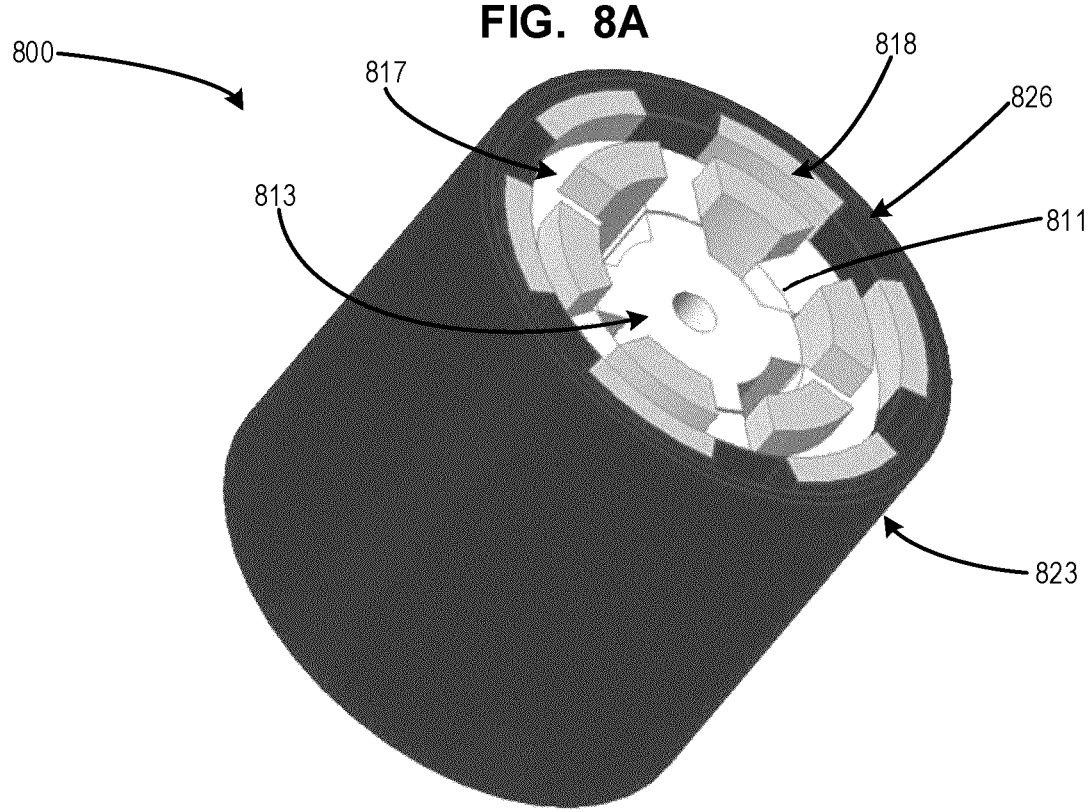
FIG. 8B shows a perspective view of the switched reluctance machine of FIG. 8A.

Referring now to FIG. 8B, shown therein is a perspective view of switched reluctance machine 800. As FIG. 8B illustrates, the housing 823 substantially encloses the stator 817, rotor 813, and coil windings 818. The cooling channels 822 are also integrated into the housing 823, between the inner surface 825 and outer surface 824, at 826.

Figure 9A:
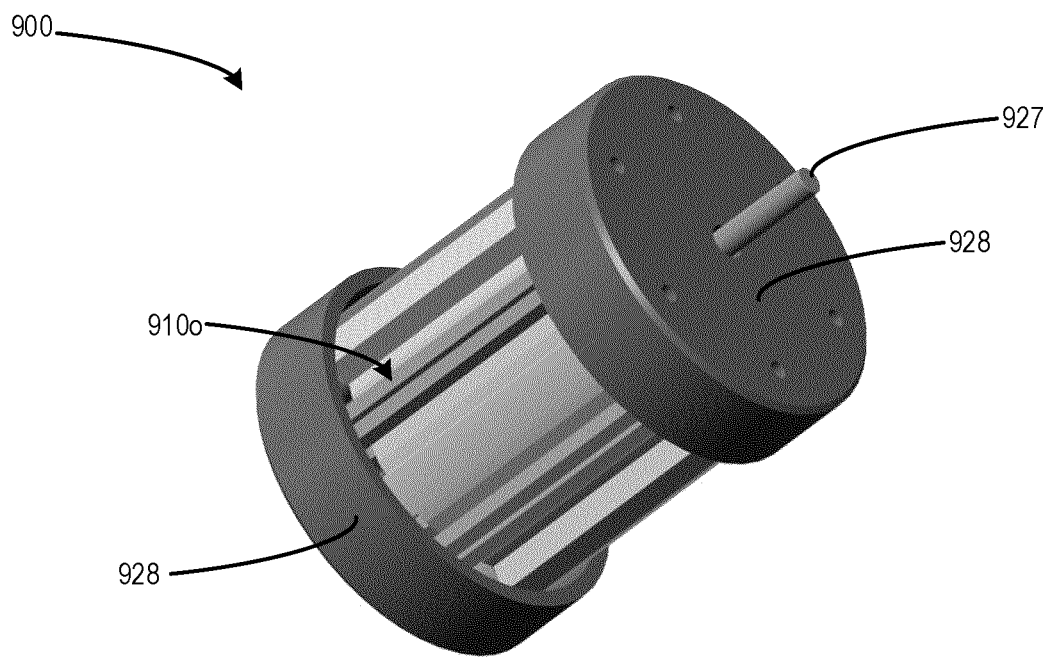
FIG. 9A shows a perspective view of a switched reluctance machine in accordance with another example embodiment.

Referring now to FIG. 9A, shown therein is a perspective view of a high-speed switched reluctance machine 900. The structure of the stator, rotor and coil windings 910 of switched reluctance machine 900 generally corresponds to the stators 217/717, rotors 213/713 and coil windings 210/710 of switched reluctance machines 200a and 700. Switched reluctance machine 900 also includes a shaft 927. A partial casing 928 may be used to provide structural support to the stator of switched reluctance machine 900.

The partial casing 928 may provide this structural support while at least partially exposing the windings 910. In switched reluctance machine 900, the outer winding portions 910o of the windings 910 are exposed (although they may be protected by electrically insulating materials). This may allow the windings 910 to be cooled directly, e.g. by direct exposure to air. As explained above, directly cooling the outer winding portions 910o may improve the thermal performance of the switched reluctance machine 900.

As the outer winding portions can be directly exposed to air, or to cooling channels, the embodiments described herein can be implemented in high-speed switched reluctance machines. For instance, embodiments described herein may be implemented at rotor speeds of greater than 5,000 RPM. In some cases, the rotor speeds may be greater than 25,000 RPM. In further embodiments, the rotor speeds may be upwards of 50,000 RPM or greater.

Figure 9B:
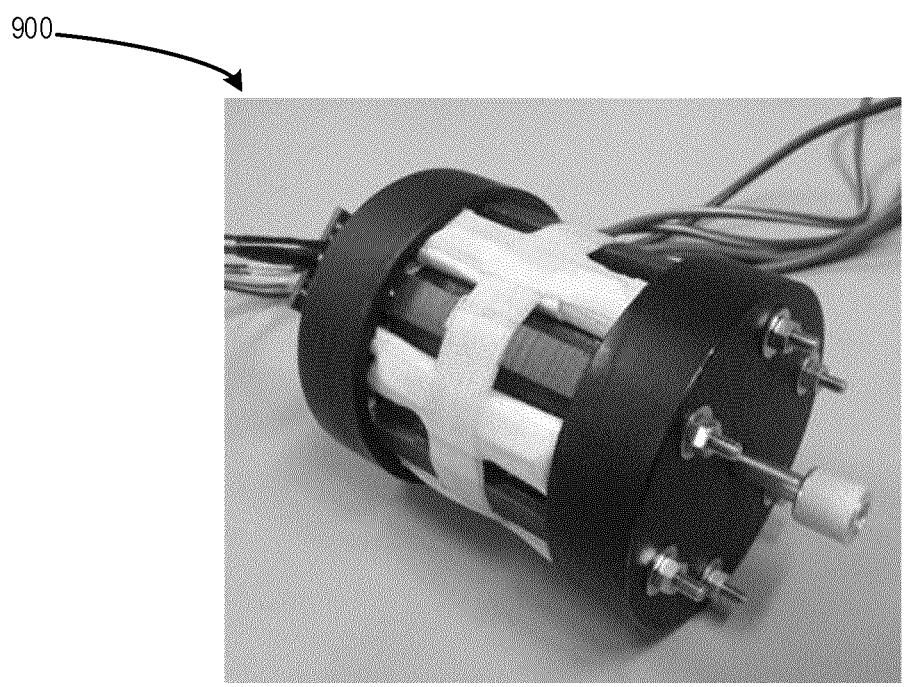
FIG. 9B shows a perspective view of an implementation of the switched reluctance machine of FIG. 9A in accordance with an example embodiment.

A high-speed switched reluctance machine 900 with toroidal winding configured to operate at 50,000 RPM was built and tested in the McMaster Automotive Resource Center (MARC). Using a conventional 3-phase asymmetric converter and classic angular control, switched reluctance machine provided torque capability substantially equivalent to conventionally wound SRMs. However, the ability to more easily cool the switched reluctance machine 900 may provide better thermal performance at high-speeds. FIG. 9B illustrates another perspective view of the switched reluctance machine 900.

While the present application has been described with reference to examples, it is to be understood that the scope of the claims should not be limited by the embodiments set forth in the examples, but should be given the broadest interpretation consistent with the description as a whole.

Alterations, modifications and variations may be effected to the particular embodiments by those of ordinary skill in the art, in light of this teaching, without departing from the spirit of or exceeding the scope of the claimed invention.

For example, although the example embodiments described herein have been described with reference to switched reluctance machines having six stator poles and four rotor poles, other embodiments may be implemented in switched reluctance machines with any number of rotor stator pole combinations. Aspects of the embodiments described herein may also be applied to axial flux and exterior rotor switched reluctance and other machine technologies such as interior permanent magnet machines, surface permanent magnet machines, and induction machines.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A switched reluctance machine comprising:
    a stator having a stator core that is salient with stator poles;
    a plurality of coil windings around the stator core, wherein the plurality of coil windings define a plurality of phases of the switched reluctance machine, wherein each coil winding corresponds to a particular phase in the plurality of phases, wherein each phase in the plurality of phases is independently excitable by providing electrical current to the corresponding coil windings; and
    a rotor that is salient with rotor poles, the rotor disposed concentrically with the stator;
    wherein each stator pole has a corresponding pair of the coil windings wound around the stator core on either side of that stator pole, wherein for each stator pole the corresponding pair of the coil windings includes a first coil winding wound around the stator core adjacent to a first side of the stator pole and a second coil winding wound around the stator core adjacent to a second side of the stator pole;
    wherein each stator pole is excitable by concurrently providing electrical current to the first coil winding and the second coil winding of the corresponding pair of the coil windings to induce magnetic flux through that stator pole and thereby excite that stator pole; and
    wherein the rotor is rotatable to align the rotor poles with excited stator poles.

2. The switched reluctance machine of claim 1, wherein for each corresponding pair of the coil windings:
    the first coil winding corresponds to a first phase of the plurality of phases, and the first phase has a first active period, wherein during the first active period electrical current is provided to each coil winding that corresponds to the first phase;
    the second coil winding corresponds to a second phase of the plurality of phases, and the second phase has a second active period, wherein during the second active period electrical current is provided to each coil winding that corresponds to the second phase; and
    the first active period and the second active period partially overlap.

3. The switched reluctance machine of claim 2, wherein each coil winding in the plurality of coil windings corresponds to a different phase of the plurality of phases.

4. The switched reluctance machine of claim 1, wherein for each corresponding pair of the coil windings:
    the first coil winding and the second coil winding correspond to the same phase.

5. The switched reluctance machine of claim 1, wherein the stator comprises a plurality of joined stator segments, each stator segment comprising at least one of the stator poles.

6. The switched reluctance machine of claim 5, wherein each stator segment comprises one stator pole.

7. The switched reluctance machine of claim 5, wherein each stator segment has an alignment guide that is mateable with a corresponding alignment guide of an adjacent stator segment.

8. The switched reluctance machine of claim 1, wherein each coil winding has an outer winding portion on an outer side of the stator core that is configured to be cooled.

9. The switched reluctance machine of claim 8, further comprising at least one cooling channel, wherein the outer winding portion of each coil winding is adjacent to at least one of the cooling channels.

10. The switched reluctance machine of claim 1, further comprising a housing substantially enclosing the stator, rotor and the plurality of coil windings.

11. The switched reluctance machine of claim 1, wherein the rotor is configured to rotate at more than 5,000 RPM.

12. The switched reluctance machine of claim 11, wherein the rotor is configured to rotate at up to at least 50,000 RPM.

13. A method of manufacturing a switched reluctance machine, the method comprising:
    providing a stator having a stator core that is salient with stator poles;
    winding a plurality of coil windings about the stator core such that for each stator pole there is a corresponding pair of the coil windings adjacent to that stator pole, each corresponding pair of coil windings including a first coil winding around the stator core adjacent to a first side of the corresponding stator pole and a second coil winding around the stator core adjacent to a second side of the corresponding stator pole, and each corresponding pair of coil windings is configured to excite the corresponding stator pole by inducing magnetic flux through that stator pole, wherein each stator pole is excitable by concurrently providing electrical current to the first coil winding and the second coil winding of the corresponding pair of the coil windings; and
    disposing a rotor that is salient with rotor poles concentrically with the stator;
    wherein the plurality of coil windings are wound about the stator core to define a plurality of phases of the switched reluctance machine, wherein each coil winding corresponds to a particular phase in the plurality of phases, wherein each phase in the plurality of phases is independently excitable by providing electrical current to the corresponding coil windings.

14. The method of claim 13, wherein
    providing the stator comprises
        i) providing a plurality of stator segments, each stator segment comprising a stator core segment and at least one of the stator poles; and
        ii) joining the stator core segments to form the stator; and wherein at least one of the coil windings is wound about a corresponding stator core segment prior to joining the stator core segments.

15. The method of claim 14, wherein all of the coil windings are wound about corresponding stator core segments prior to joining the stator core segments.

16. The method of claim 14, wherein at least one stator segment comprises one stator pole and a pair of adjacent stator core segments, and for the at least one stator segment a coil winding is wound about each adjacent stator core segment prior to joining the stator core segments.

17. The method of claim 13, further comprising mating each stator core segment with an adjacent stator core segment prior to joining the stator core segments.

18. The method of claim 13, further comprising disposing a cooling channel adjacent at least one of the coil windings.

19. The method of claim 13, further comprising providing a housing substantially enclosing the stator, rotor and the plurality of coil windings.

20. A method of operating a switched reluctance machine having a rotor that is salient with rotor poles and a stator having a stator core that is salient with stator poles, wherein the stator poles comprise a sequence of stator poles the method comprising:
concurrently providing electrical current to a first coil winding around the stator core adjacent a first side of a particular stator pole and to a second coil winding around the stator core adjacent a second side of the particular stator pole to induce magnetic flux in the particular stator pole;
aligning one of the rotor poles to the particular stator pole to provide a motor operation in the switched reluctance machine;
determining a position of the rotor poles;
sequentially inducing magnetic flux in the stator poles based on the position of the rotor poles, wherein the magnetic flux in each stator pole is induced by concurrently providing electrical current to a particular first coil winding around the stator core adjacent a particular first side of that stator pole and to a particular second coil winding around the stator core adjacent a particular second side of that stator pole; and
aligning the rotor poles with the stator poles to provide the motor operation;
wherein the switched reluctance machine comprises a plurality of coil windings around the stator core, wherein the plurality of coil windings include the particular first coil winding and the particular second coil winding and the plurality of coil windings define a plurality of phases of the switched reluctance machine, wherein each coil winding corresponds to a particular phase in the plurality of phases, wherein each phase in the plurality of phases is independently excitable by providing electrical current to the corresponding coil windings.

21. The method of claim 20, wherein for each stator pole, the first coil winding and the second coil winding adjacent that stator pole correspond to the same phase.

22. The method of claim 20, wherein for each stator pole, the first coil winding adjacent that stator pole corresponds to a first phase;
the second coil winding adjacent that stator pole corresponds to a second phase; and
the electrical current is provided in the first phase and the second phase for a partially overlapping period.

23. The method of claim 20, wherein the rotor rotates at more than 5,000 RPM to align the one of the rotor poles to the particular stator pole.

24. The method of claim 23, wherein the rotor rotates up to at least 50,000 RPM to align the one of the rotor poles to the particular stator pole.

25. The method of claim 20, further comprising directly cooling at least one of the first coil winding and the second coil winding.

* * * * *